US012259109B2

(12) United States Patent
Jurik et al.

(10) Patent No.: US 12,259,109 B2
(45) Date of Patent: Mar. 25, 2025

(54) SYSTEMS FOR A LUMINAIRE

(71) Applicant: ROBE lighting s.r.o., Roznov pod Radhostem (CZ)

(72) Inventors: Pavel Jurik, Prostredni Becva (CZ); Jan Vilem, Valasske Mezirici (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 18/820,904

(22) Filed: Aug. 30, 2024

(65) Prior Publication Data

US 2024/0418348 A1 Dec. 19, 2024

Related U.S. Application Data

(60) Provisional application No. 63/580,290, filed on Sep. 1, 2023.

(51) Int. Cl.
*F21V 11/10* (2006.01)
*F21V 21/30* (2006.01)
(Continued)

(52) U.S. Cl.
CPC .............. *F21V 11/10* (2013.01); *F21V 21/30* (2013.01); *F21V 33/0052* (2013.01); *H05B 47/17* (2020.01); *H05B 47/175* (2020.01)

(58) Field of Classification Search
CPC ...... F21V 11/10; F21V 21/30; F21V 33/0052; F21V 11/08; F21V 11/00; H05B 47/175;
(Continued)

(56) References Cited

U.S. PATENT DOCUMENTS 5,023,709 A 6/1991 Kita et al.
6,079,862 A 6/2000 Kawashima et al.
(Continued)

FOREIGN PATENT DOCUMENTS

CN 202915103 U 5/2013
CN 212805305 U 3/2021
CN 217928572 U 11/2022

OTHER PUBLICATIONS

Jurik, Pavel, et al.; U.S. Appl. No. 18/820,913; Filing Date: Aug. 30, 2024; Title: Systems for a Luminaire; 33 pages.
(Continued)

*Primary Examiner* — Bao Q Truong
(74) *Attorney, Agent, or Firm* — Conley Rose, P.C.; Brooks W Taylor; Matthew Gibson

(57) ABSTRACT

A luminaire includes a light source configured to generate an emitted light beam, and a beam reducer configured to move between a first position and a second position. In the first position, the beam reducer is outside the emitted light beam, and in the second position, the beam reducer receives the emitted light beam and occludes an outer portion of the emitted light beam to emit a reduced light beam having a smaller beam angle than the emitted light beam. The luminaire also includes a beam size iris configured to receive (i) the emitted light beam when the beam reducer is in the first position and (ii) the reduced light beam when the beam reducer is in the second position. The beam reducer is configured to move to the second position in response to an aperture of the beam size iris being smaller than a predetermined threshold value.

21 Claims, 9 Drawing Sheets

(51) Int. Cl.
*F21V 33/00* (2006.01)
*H05B 47/17* (2020.01)
*H05B 47/175* (2020.01)

(58) Field of Classification Search
CPC ............. H05B 47/17; F21W 2131/406; F21W 2131/407; G03B 21/00
See application file for complete search history.

(56) References Cited

U.S. PATENT DOCUMENTS

| | | | | |
|---|---|---|---|---|
| 9,933,137 | B2 | 4/2018 | Kjeldsen et al. | |
| 10,678,220 | B2 | 6/2020 | Farnik et al. | |
| 2009/0168041 | A1 | 7/2009 | Sawai | |
| 2010/0246183 | A1* | 9/2010 | Jurik | G03B 9/06 362/281 |
| 2010/0246185 | A1* | 9/2010 | Jurik | F21V 14/04 362/296.05 |
| 2013/0094215 | A1* | 4/2013 | Jurik | F21V 14/04 362/296.01 |
| 2016/0097493 | A1 | 4/2016 | Anderson et al. | |
| 2016/0231576 | A1* | 8/2016 | Jurik | F21V 7/0066 |
| 2016/0312983 | A1 | 10/2016 | Guercio et al. | |
| 2017/0009969 | A1 | 1/2017 | Conti et al. | |
| 2017/0114990 | A1 | 4/2017 | Chae et al. | |
| 2018/0180268 | A1* | 6/2018 | Jurik | G02B 19/0066 |
| 2018/0292809 | A1 | 10/2018 | Farnik et al. | |
| 2021/0095843 | A1 | 4/2021 | Zhao | |
| 2023/0184420 | A1 | 6/2023 | Yin et al. | |

OTHER PUBLICATIONS

Office Action dated Nov. 19, 2024; U.S. Appl. No. 18/820,913, filed Aug. 30, 2024; 14 pages.
Final Office Action dated Feb. 14, 2025; U.S. Appl. No. 18/820,913, filed Aug. 30, 2024; 18 pages.
European Extended Search Report; Application No. 24197271.0; Feb. 6, 2025; 9 pages.
European Extended Search Report; Application No. 24197234.8 Jan. 23, 2025; 11 pages.

* cited by examiner

SYSTEMS FOR A LUMINAIRE

CROSS-REFERENCE TO RELATED APPLICATIONS

This patent application claims the benefit of U.S. Provisional Application No. 63/580,290 filed Sep. 1, 2023, entitled "SYSTEMS FOR A LUMINAIRE" which is hereby incorporated by reference in its entirety.

TECHNICAL FIELD OF THE DISCLOSURE

The disclosure generally relates to luminaires, and more specifically to a removable camera system and an optical system for an automated luminaire.

BACKGROUND

Some luminaires in the entertainment and architectural lighting markets include automated and remotely controllable functions. Such luminaires may be used in theatres, television studios, concerts, theme parks, night clubs, and other venues. A luminaire may provide control over the pan and tilt functions of the luminaire allowing an operator to control a direction that the luminaire is pointing and thus a position of the luminaire's light beam on a stage or in a studio. Such position control may be obtained via control of the luminaire's position in two orthogonal rotational axes, which may be referred to as pan and tilt. Some luminaires provide control over other parameters such as intensity, color, focus, beam size, beam shape, and/or beam pattern. Where such luminaires are remotely controllable, they may be referred to as automated luminaires.

The optical systems of such automated luminaires may be designed to enable a user to control the beam size, from a very narrow output beam to a wider, wash beam. Such control may allow such luminaires to be used with long throws to a target or for almost parallel light effects as well as for wider, more traditional wash effects. Optical systems with the ability to produce narrow beams may be referred to as 'Beam' optics, while optical systems with the ability to produce wide beams may be referred to as 'Wash' optics.

SUMMARY

In a first embodiment, a luminaire includes a light source configured to generate an emitted light beam, and a beam reducer configured to move between a first position and a second position. In the first position, the beam reducer is outside the emitted light beam, and in the second position, the beam reducer receives the emitted light beam and occludes an outer portion of the emitted light beam to emit a reduced light beam having a smaller beam angle than the emitted light beam. In the second position, the beam reducer is configured to absorb optical energy of the outer portion of the emitted light beam without damage to the beam reducer. The luminaire also includes a beam size iris configured to receive (i) the emitted light beam when the beam reducer is in the first position and (ii) the reduced light beam when the beam reducer is in the second position. The beam reducer is configured to move to the second position in response to an aperture of the beam size iris being smaller than a predetermined threshold value.

In a second embodiment, a luminaire control system includes an actuator configured to move a beam reducer between a first position and a second position. In the first position, the beam reducer is outside an emitted light beam, and in the second position, the beam reducer receives the emitted light beam and occludes an outer portion of the emitted light beam to emit a reduced light beam having a smaller beam angle than the emitted light beam. The luminaire control system also includes a beam size iris configured to receive (i) the emitted light beam when the beam reducer is in the first position and (ii) the reduced light beam when the beam reducer is in the second position; and a control system electrically coupled to the actuator and the beam size iris and configured to adjust an aperture of the beam size iris, and cause the actuator to move the beam reducer between the first position and the second position.

In a third embodiment, a method of controlling a luminaire includes receiving, by a control system of the luminaire via a data link, a command indicating a commanded aperture value of a beam size iris; and causing, by the control system, a beam reducer of the luminaire to move between a first position and a second position based on the commanded aperture value. In the first position, the beam reducer is outside a light beam emitted from a light source of the luminaire, and in the second position, the beam reducer receives the emitted light beam and occludes an outer portion of the emitted light beam to emit a reduced light beam having a smaller beam angle than the emitted light beam.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Figure 1:
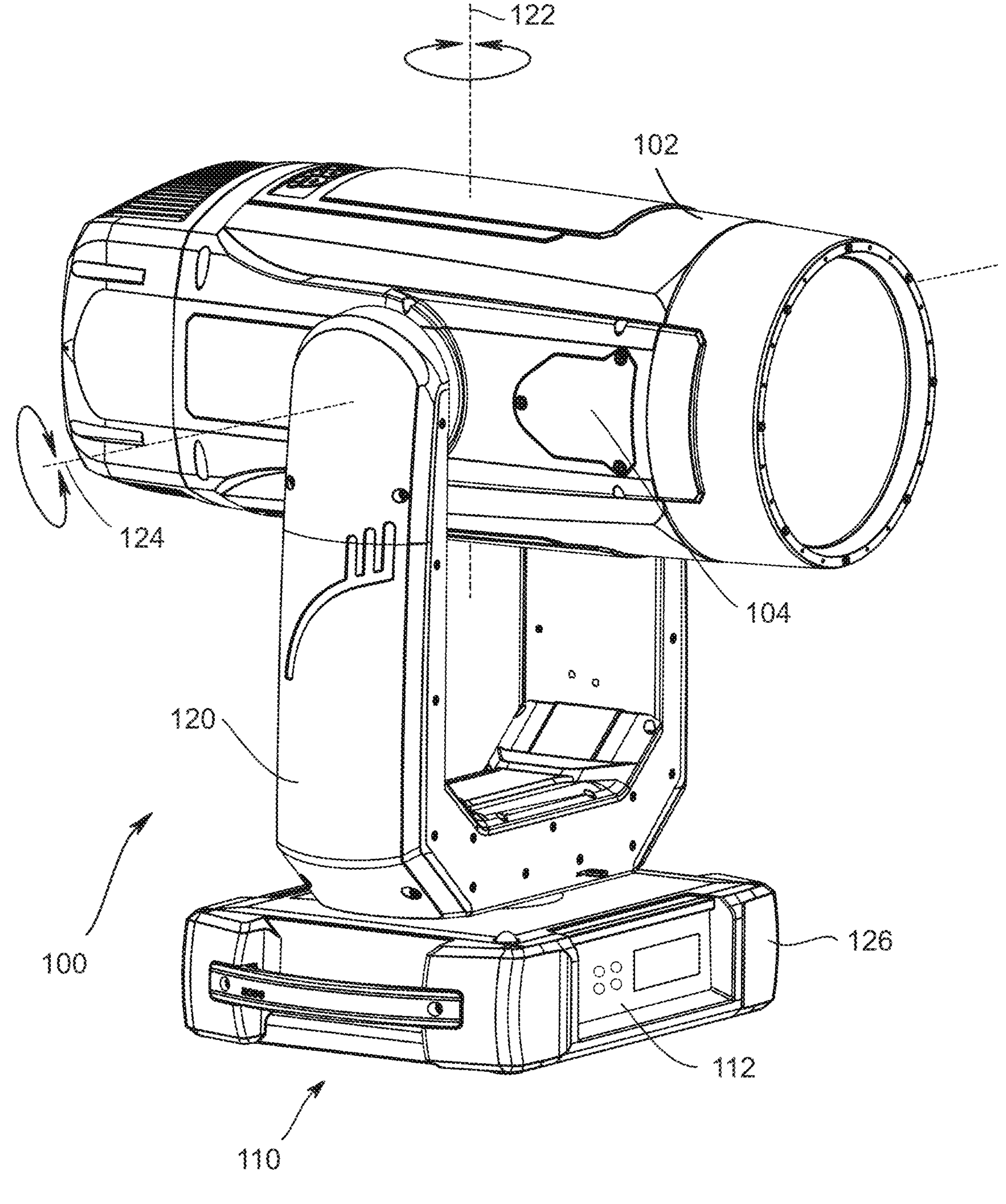
FIG. 1 presents an isometric view of a luminaire according to the disclosure in a first configuration.

Preferred embodiments are illustrated in the figures, like numerals being used to refer to like and corresponding parts of the various drawings.

Some luminaires (both automated and non-automated) comprise a light source including a discharge lamp or a light emitting diode (LED) array, or laser-based light source, where a laser LED is used as a pump for a light emitting phosphor.

Some automated luminaires may be used as followspots, allowing a remote operator to control the pan and tilt of a luminaire so as to illuminate a performer as the performer moves around the stage or performance area. Such luminaires may be fitted with a camera, allowing the operator to view the output of the luminaire.

Luminaires comprising a light source according to the disclosure may comprise a variety of optical systems: a fixed "beam" optical system that maintains the small diameter of the beam emitted by the light source, a fixed "wash" optical system that produces a wide beam, or a zoom optical system that can change the beam diameter from a narrow beam to a wide beam. Such a zoom optical system may also have the ability to produce good quality imagery from gobos or patterns inserted into the optical train.

It may be useful to reduce tradeoffs associated with luminaires that are configured to operate as both a follow-spot (e.g., using beam optics to operate in a long throw mode) and a wash light (e.g., using wash optics). For example, luminaires may be fitted with an iris that allows the user to reduce a size of the output beam (a beam size iris). The beam size iris may include a relatively large number of iris leaves to enable generating a relatively narrow beam with a substantially circular cross-section. In some cases, a larger number of iris leaves may require that the individual iris leaves each be relatively thinner, in order to avoid overly impacting the form factor of the luminaire or the beam size iris. With high power light sources, such an iris, when closed or partially closed, may absorb large amounts of energy (e.g., optical energy) from the impinging light beam, potentially causing damage to the iris. The damage to thinner iris leaves may be more severe and/or occur more quickly, as well. The present disclosure presents a system and method to mitigate such potential damage.

Also, it may be useful to reduce tradeoffs associated with providing a camera-enabled luminaire. For example, luminaires may further be fitted with video cameras, to enable a remote operator to view the output of the luminaire. However, a luminaire with an integrated camera may be correspondingly more expensive. If such a luminaire is used in a scenario in which the camera is not needed, this may represent a waste of operator resources. Because such cameras are not always needed, embodiments of this disclosure may provide a luminaire with a removable (or after-installed) camera, which may reduce the cost to the operator in scenarios in which the camera is not needed. However, the addition or removal of such a camera could alter the balance of the luminaire, and thus impact the effectiveness of hardware (e.g., motors, actuators) for controlling movement of the luminaire. The current disclosure presents a system and method to mitigate such alteration of balance.

FIG. 1 presents an isometric view of a luminaire 100 according to the disclosure in a first configuration. The luminaire 100 is a luminaire comprising a head 102 which is configured to rotate within a yoke 120 about a tilt axis 124. The yoke 120 is configured to rotate relative to a fixed enclosure 126 about a pan axis 122. The pan axis 122 and the tilt axis 124 are orthogonal to each other. Both pan and tilt motions may be mechanically coupled to hand-operated manual controls or may be coupled for motion to motors, linear actuators, or other electromechanically controlled mechanisms. Such electromechanical mechanisms may be under the control of a control system 110 (e.g., a microcontroller or other programmable processing system) included in the luminaire 100. In some embodiments, the control system 110 may be controlled locally via a user interface 112 included in the luminaire 100. In other embodiments, the control system may be in wired or wireless communication via a data link with a remotely located control console that an operator uses to indicate a desired position of the head 102. In such embodiments, the operator is able to direct light output from the luminaire 100 in a desired direction, through motion of the head 102 in the pan axis 122 and tilt axis 124.

As shown in FIG. 1, the luminaire 100 includes a cover plate 104 for a mounting structure for a camera module. The cover plate 104 is configured to cover a camera access port of the head 102. As described further below, the cover plate 104 is configured to be removably mounted to the camera access port of the head 102. Thus, when the cover plate 104 is mounted to the head 102, the cover plate 104 covers the camera access port. Similarly, a camera module is configured to be removably mounted to the camera access port of the head 102. Thus, when the camera module is mounted to the head 102, the camera module covers the camera access port.

Figure 2:
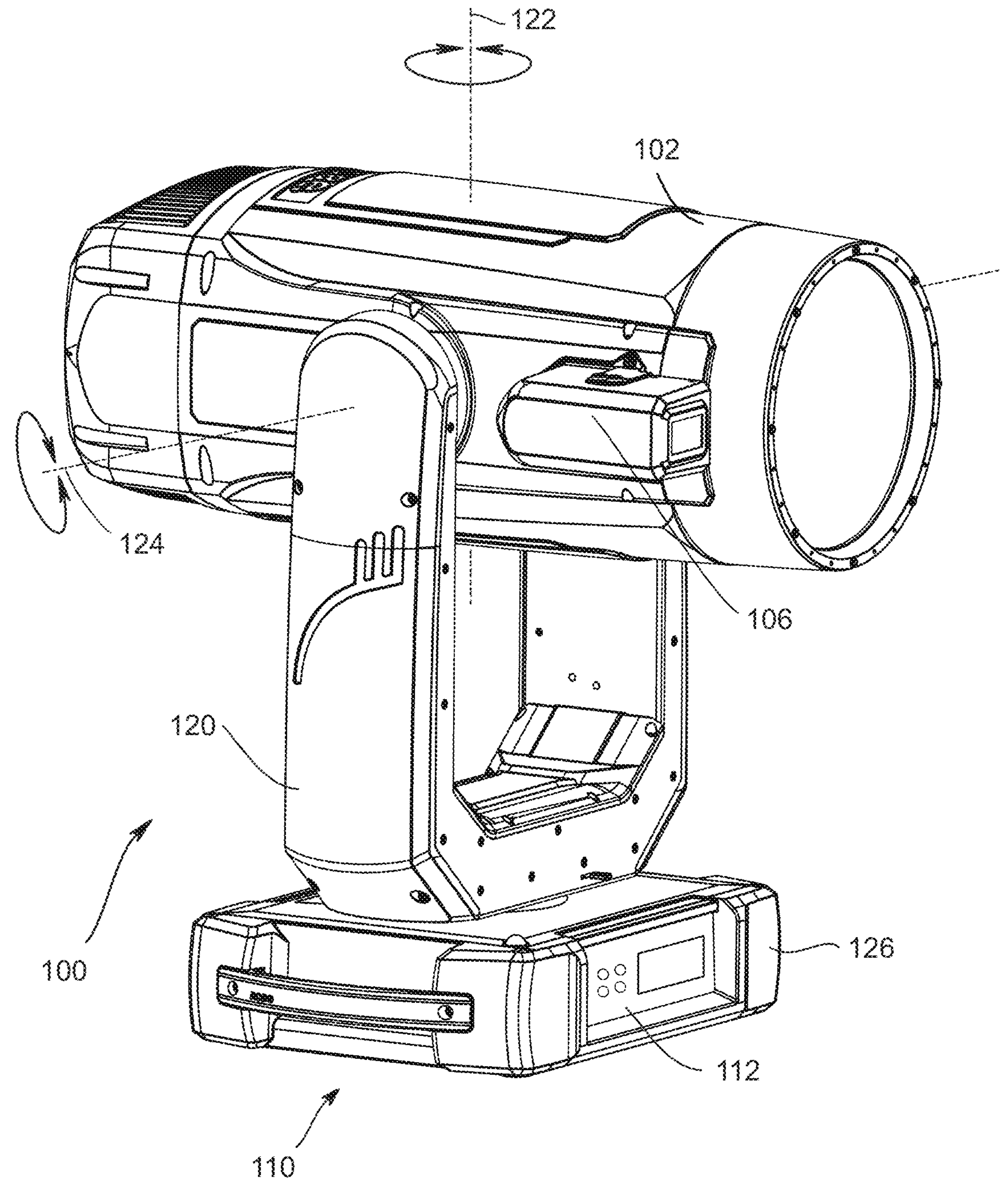
FIG. 2 presents an isometric view of the luminaire of FIG. 1 with a camera module attached to the head.

FIG. 2 presents an isometric view of the luminaire 100 of FIG. 1, with the cover plate 104 removed and a camera module 106 mounted to the luminaire 100 in its place. The camera module 106 includes a camera configured to generate image data based on light received from a field of view of the camera. The camera module 106 also includes a mounting base that is coupled to the camera and configured to be removably mounted to the luminaire 100. The mounting base of the camera module 106 is configured to cover the camera access port of the head 102, as explained above.

In some embodiments, the cover plate 104 is fitted with internal material such that a weight of the cover plate 104 approximately matches that of the camera module 106. In some examples, the weight of the cover plate 104 approximately matching the weight of the camera module 106 is satisfied when the weight of the cover plate 104 is within +/−10% of the weight of the camera module 106. In some embodiments, the camera module 106 weighs 1 kilogram (kg). Matching the weight of cover plate 104 to the weight of camera module 106 mitigates a change in the balance of head 102 around tilt axis 124 when the cover plate 104 is removed and the camera module 106 is mounted, or vice versa.

While the camera module 106 is shown as mounted to an automated luminaire (the luminaire 100), camera modules according to the disclosure may be mounted to other types of luminaires (for example, non-automated luminaires, as well as moving and static luminaires).

Figure 3:
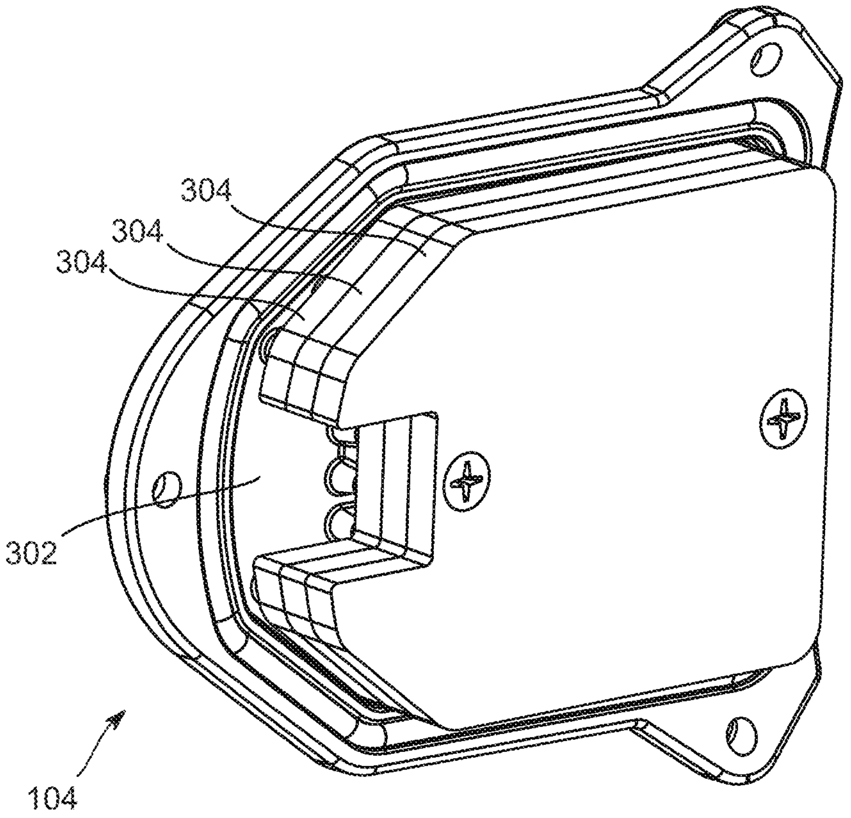
FIG. 3 presents a schematic view of a cover plate for the luminaire of FIG. 1 including removable counterweight modules according to the disclosure.

FIG. 3 shows a schematic view of an inner face 302 of the cover plate 104 in accordance with an embodiment of this disclosure. In this example, a plurality of counterweight modules 304 are removably coupled to the inner face 302 of the cover plate 104. The counterweight modules 304 may be coupled to the cover plate 104 using any removable coupling, such as semi-permanent adhesives, hook-and-loop type couplings, various rail- or track-mount type couplings, and the like. In the example of FIG. 3, the counterweight modules 304 are depicted in a stacked configuration; however, in other examples, the counterweight modules 304 may be distributed in other manners. Because the counterweight modules 304 are removable or interchangeable, the weight of the cover plate 104 may be adjusted, or "tuned" to more closely match a variety of different camera modules.

For example, without any counterweight modules 304 coupled thereto, the cover plate 104 may weigh 200 grams (g). Continuing this example, the counterweight modules 304 may each weigh 200 g. Accordingly, in the example in which the camera module 106 weighs 1 kg, four counterweight modules 304 are coupled to the cover plate 104 and thus total weight of the cover plate 104 (i.e., including counterweight modules 304) is 1 kg, which approximately matches that of the camera module 106.

In another example, a lighter camera module 106 is used, which only weighs approximately 700 g. Because the unloaded cover plate 104 weighs 200 g, an additional 500 g of counterweight is provided by counterweight modules 304, such as a combination of two 200 g counterweight modules 304 and one 100 g counterweight module 304. Accordingly, the cover plate 104 in this example is also tunable to a weight that approximately matches that of the lighter camera module 106.

Figure 4:
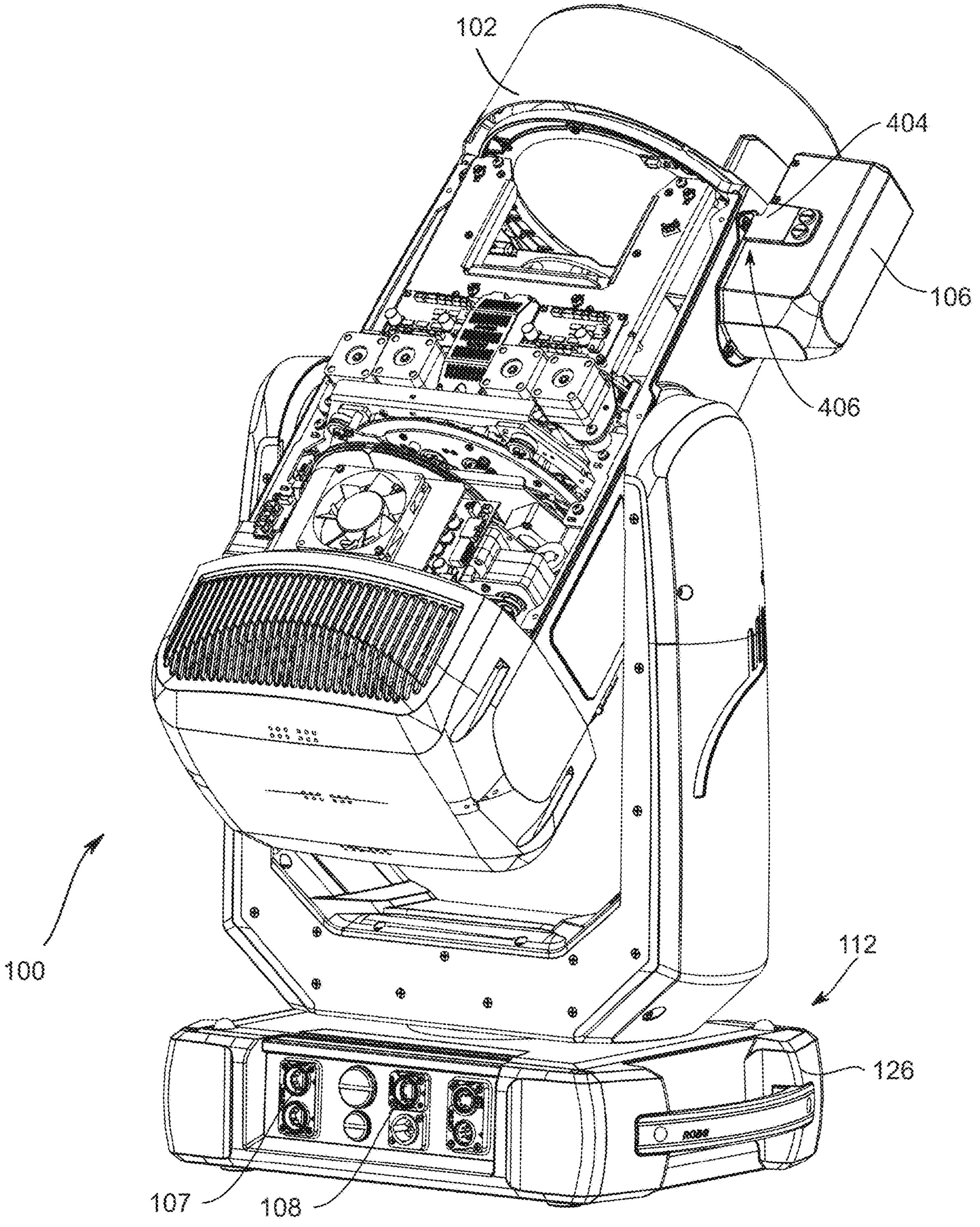
FIG. 4 presents an isometric view of the luminaire of FIG. 2 with a head cover removed and showing an output connector of the camera.

FIG. 4 presents an isometric view of the luminaire 100 of FIG. 2 with a head cover removed. FIG. 4 also shows a data link 107 and a camera output connector 108 on the fixed enclosure 126. As explained above, the luminaire 100 includes a control system (or controller) 110 of the luminaire 100. The control system 110 is configured to control a motion of the various electromechanical mechanisms of the luminaire 100. In various embodiments, the control system 110 comprises a microcontroller or other programmable processing system. In some embodiments, the control system 110 may be coupled for local control to a user interface 112 included in the luminaire 100 and configured to receive therefrom signals relating to desired positions of the electromechanical mechanisms.

In other embodiments, the control system 110 may be coupled for remote control by the data link 107 (e.g., a wired or wireless data link) to a remotely located control console and to receive signals therefrom (e.g., commands) indicating various electrical or electromechanical control operations to be carried out by the luminaire 100 (or a camera module 106 coupled thereto). The data link 107 may use DMX512 (Digital Multiplex) protocol or other suitable communication protocol, e.g., Art-Net, Architecture for Control Networks (ACN), and Streaming ACN.

The luminaire 100 may also contain wiring that connects the camera output connector 108 to the camera module 106 mounted on the head 102. In some embodiments this wiring may be permanently installed in the luminaire and not removed or added when the camera module 106 is removed or added. Such wiring may be Cat-5, or any type of video cable. The camera output connector 108 may be an RJ45 or other type of connector suitable for video signals.

Accordingly, in some embodiments, the luminaire 100 includes both a signal connector and a power connector configured to be electrically coupled to the camera module 106 through the camera access port on the head 102. The signal connector may carry video signals from the camera module 106 to the camera output connector 108, while the power connector may provide power to the camera module 106 (e.g., from a power supply internal to the luminaire 100, or from an external power supply). In one example, the signal and power connectors are combined, such as by using a Power over Ethernet (POE) link. The signal connector may also be coupled to the data link 107 and/or the control system 110. Thus, the signal connector may provide various commands to the camera module 106 (e.g., to adjust optics or operation thereof), as well as receive various communication signals generated by the camera module 106. In one example, the camera module 106 is configured to provide a signal to the luminaire 100 when the camera module 106 is coupled thereto. This provided signal may serve as an affirmative indication (e.g., to the control system 110) that the camera module 106 is successfully electrically coupled to the luminaire 100.

In certain embodiments, the camera module 106 includes a sensor 404, which is configured to interact with a corresponding sensor 406 on the luminaire 100 when the camera module 106 is coupled to the luminaire 100. The sensors 404, 406 may be an electromechanical sensor pair, such as where a protrusion of the camera module 106 toggles a corresponding switch on the luminaire 100 when the camera module 106 is mounted to the luminaire 100. The sensors 404, 406 may also be a magnetic sensor pair, such that the sensor 404 generates a magnetic field that is sensed by the sensor 406 (e.g., as an induced current) when the camera module 106 is mounted to the luminaire 100. The sensors 404, 406 may further be an optical sensor pair, such that the sensor 404 interrupts a light signal within the sensor 406 when the camera module 106 is mounted to the luminaire 100. In general, the sensors 404, 406 may be any type of sensor pair that enables the indication that the camera module 106 is mechanically coupled to the luminaire 100. As described above, the successful coupling of the camera module 106 to the luminaire 100 may be indicated by a signal provided to the control system 110 and/or to an externally connected system, such as via data link 107.

In some embodiments, the luminaire is sealed to an ingress protection (IP) rating 65 (IP65) to reduce damage from dust or moisture. In such embodiments, both the cover plate 104 and the camera module 106 (e.g., the mounting base thereof) are fitted with gaskets or other such seals to provide such sealing. In some embodiments, the head 102 may include a particular mating region that surrounds the camera access port. The mating region is configured to facilitate sealing the head 102 to the cover plate 104 or the camera module 106, depending on which is installed at a given time, in order to provide the IP65 rating when either is mounted to the head 102. For example, the mating region may include a recess that is configured to interface with (e.g., receive) a portion of the gasket of the cover plate 104, or the gasket of the camera module 106. In another example, the mating region may also include a textured surface (e.g., a microtextured surface) that, when interfacing with the gasket of the cover plate 104 or the camera module 106, improves the resistance of the luminaire 100 to ingress of dust or moisture. In yet another example, the mating region may also include a relatively smoother surface (e.g., a polished surface) that, when interfacing with the gasket of the cover plate 104 or the camera module 106, improves the resistance of the luminaire 100 to ingress of dust or moisture. In other embodiments, the gasket may be on the head 102, and thus seals to a corresponding mating region of either the cover plate 104 or the camera module 106 (e.g., the mounting base thereof).

Figure 5:
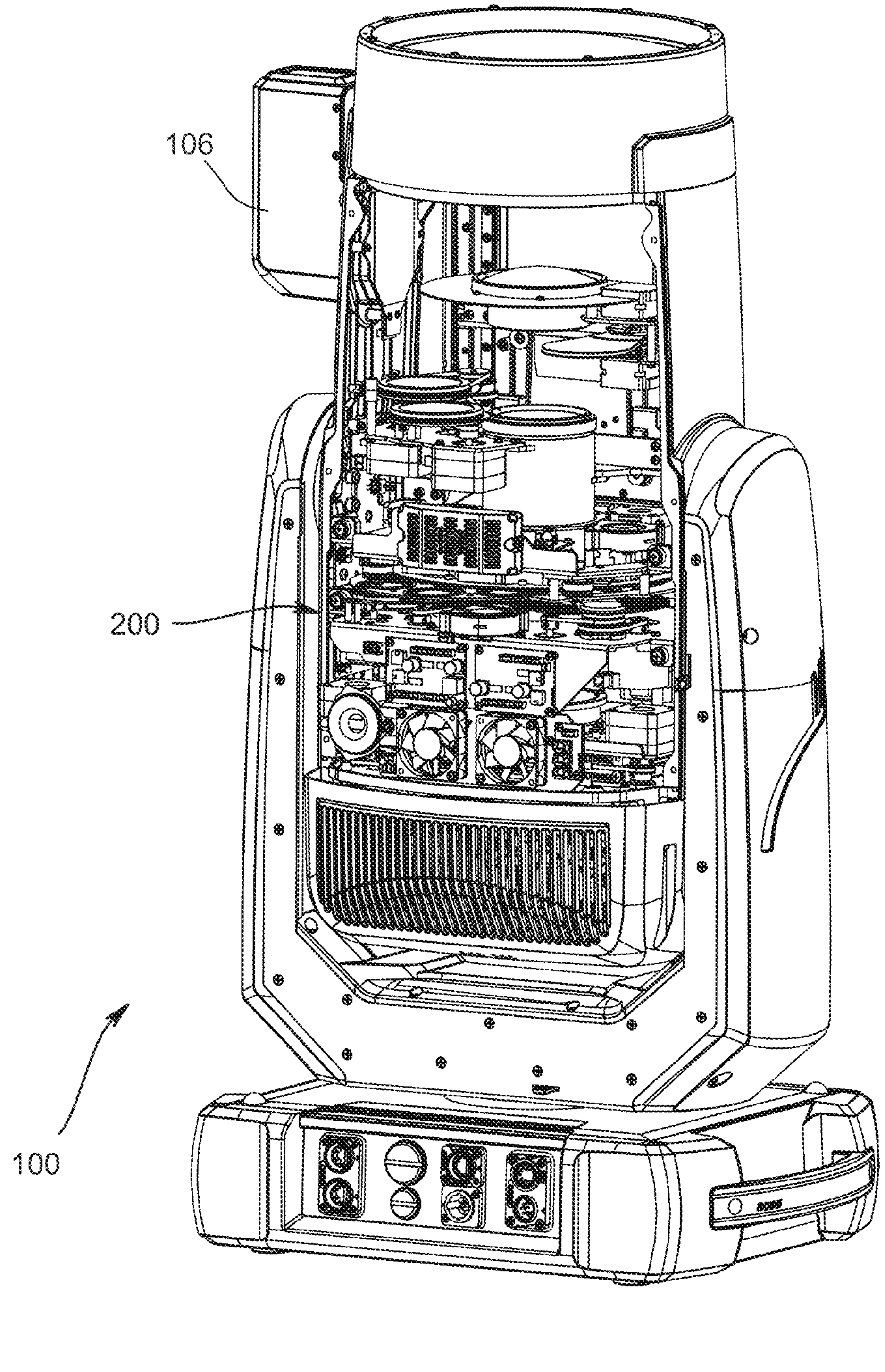
FIG. 5 presents an isometric view of the luminaire of FIG. 2 with a second head cover removed, revealing the internal optical system.
Figure 6:
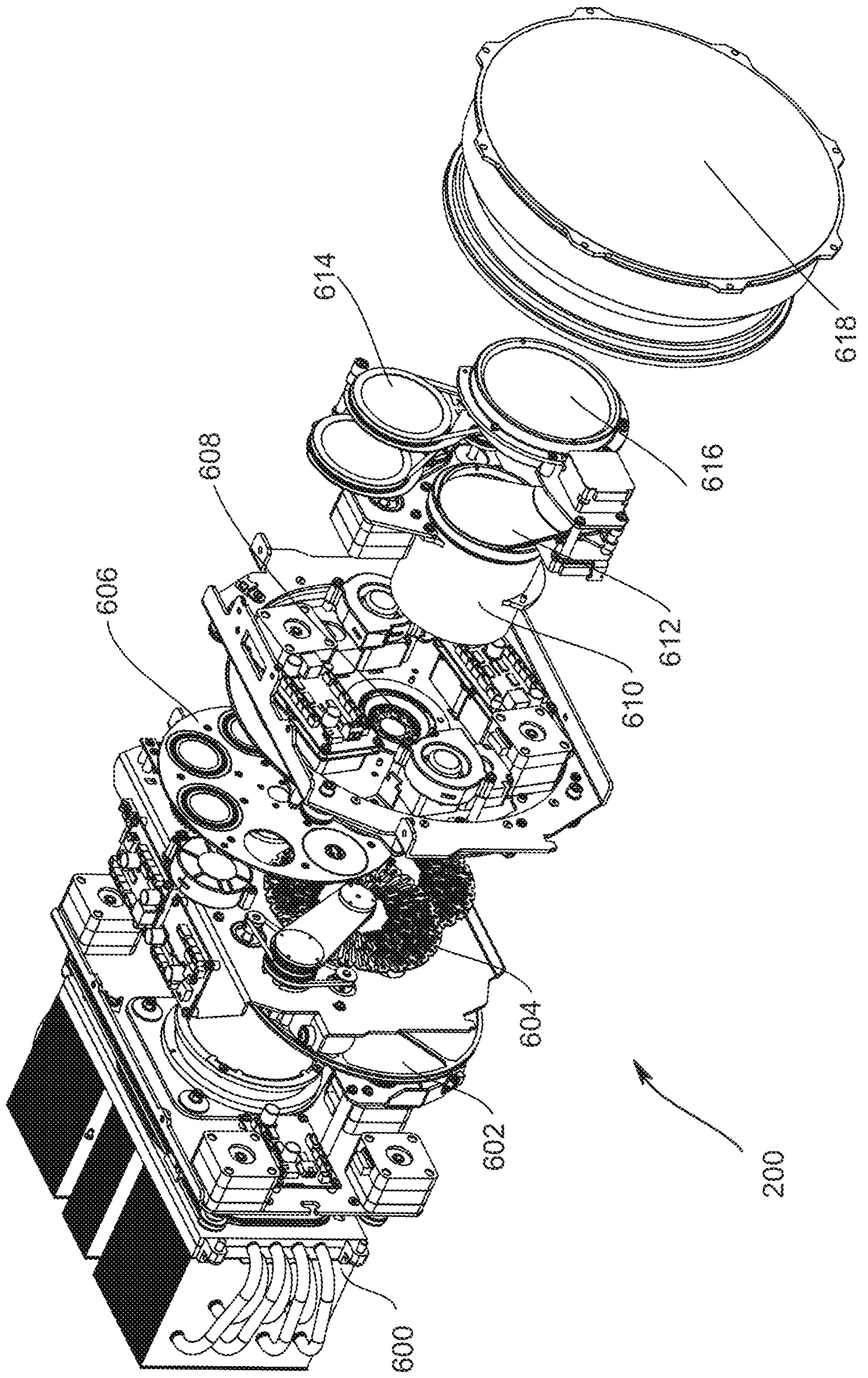
FIG. 6 presents an exploded view of the internal optical system of the luminaire of FIG. 2.

FIG. 5 presents an isometric view of the luminaire 100 of FIG. 2 with a second head cover removed revealing an internal optical system 200 of the luminaire 100. FIG. 6 presents an exploded view of the internal optical system 200. In an embodiment of the disclosure, the internal optical system 200 comprises various optical subsystems including, but not limited to, the optical subsystems described herein. A light beam is produced by a light source 600, which may be a discharge lamp, a light emitting diode (LED) array, a laser based light source, or other light source. The light beam is directed through a color filter subsystem 602 (which may comprise color wheels or subtractive color mixing systems) before passing through an animation subsystem 604. The light beam then passes from the animation subsystem 604 into an imaging subsystem comprising one or more gobo wheels 606 and a beam size iris 608. The imaging subsystem in some embodiments may also include a framing shutter subsystem. After passing through the imaging subsystem, the light beam passes through lens subsystems 610 and 616, as well as beam modifiers such as prisms 614 and frost flags 612, which may be moved into and out of the path of the light beam. The light beam is emitted from the luminaire through a final output lens 618. The lens subsystems 610, 616, and the final output lens 618 may provide a variable focal length zoom optical subsystem that is configured to adjust a beam angle of the output light beam from wide to narrow. In some embodiments, such a zoom optical system produces beam angles from 3.5° to 52°.

Moving or otherwise adjusting various components of the internal optical system 200 may be through mechanical couplings to hand-operated manual controls or to motors, linear actuators, or other electromechanical mechanisms for motion. Such electromechanical mechanisms may be electrically coupled to the control system 110. In such embodiments, the control system 110 is configured to move various components of the internal optical system 200 in response to signals (e.g., commands) received via the data link 107.

Figure 7:
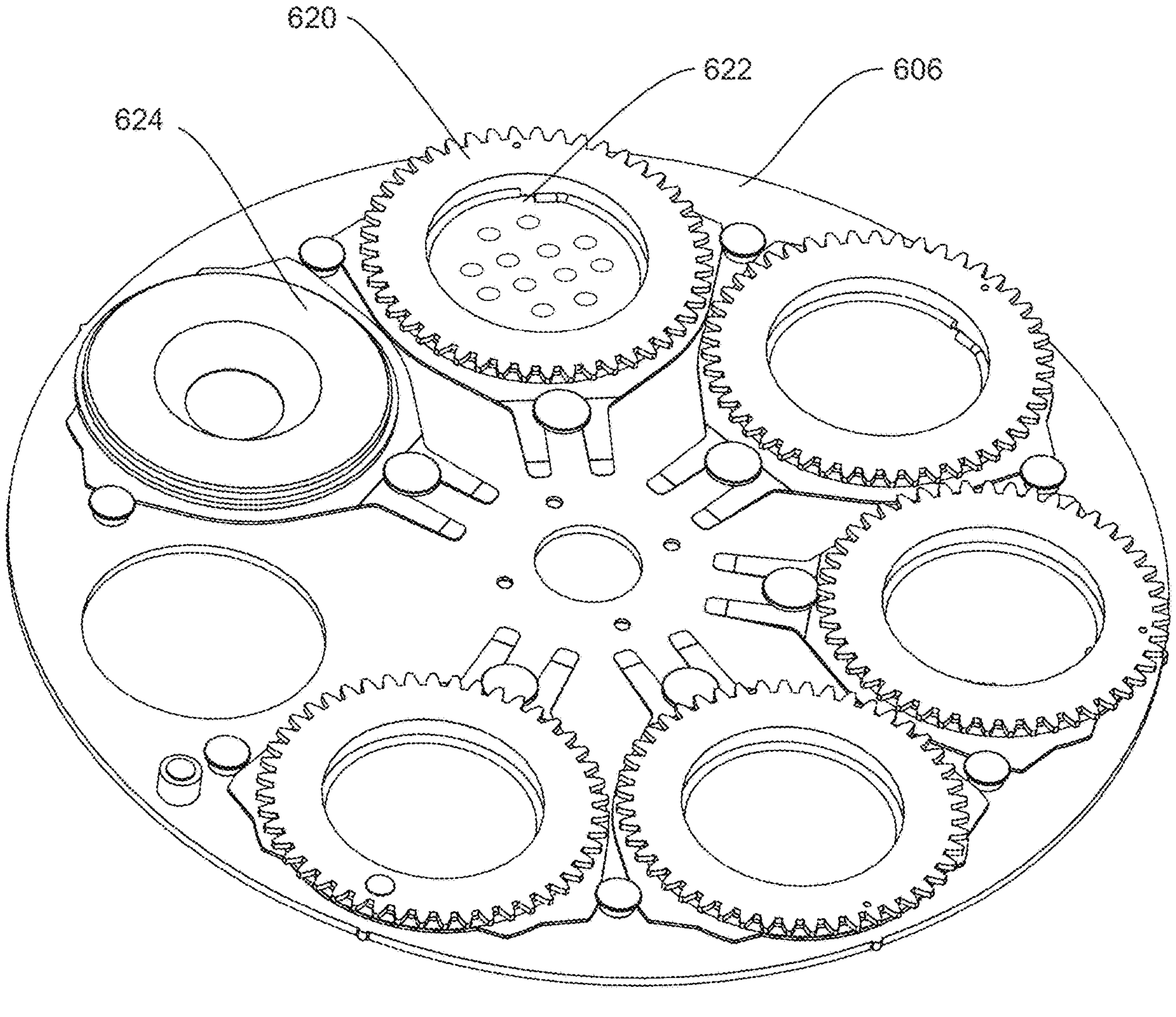
FIG. 7 presents a view of a gobo wheel of the internal optical system according to the disclosure.

FIG. 7 presents a view of the gobo wheel 606 of the internal optical system 200. The gobo wheel 606 includes a plurality of gobo holders 620, each of which may comprise a gobo or a pattern 622. The gobo wheel 606 is configured to rotate under control of the control system 110 of the luminaire 100 to position a selected one of the gobos 622 in the light beam. The gobo wheel 606 also includes a beam reducer 624 in place of, or in addition to, one of the gobo holders 620. The beam reducer 624 may be constructed of a heat resistant material, or layers of material, such that it is capable of absorbing significant energy from the light beam with little or no damage.

In operation, a user may wish to produce a very narrow angle light beam from the luminaire 100, so as to illuminate objects that are a long distance from the luminaire 100, particularly when the luminaire 100 is used as a followspot as described above. In one example, a concert production in a sports arena might entail throws of 100 meters (m) from the luminaire 100 to the stage, which may call for such very narrow angle light beams. To achieve such narrow light beams, the operator may cause the luminaire to move into a narrowest angle zoom configuration which may produce, for example, a beam angle of 3.5°. However, this narrowest angle beam from the zoom optical system may not be narrow enough for some applications. As an example, for a throw of 100 m, the operator may wish to use a light beam with a beam angle of 1° or less. To obtain this further reduction in beam angle, the operator may close the beam size iris 608 to present a narrow aperture for the zoom lens to image, thus reducing the beam angle further. In some embodiments, closing the beam size iris 608 to its minimum size may reduce the beam angle of the light beam emitted by the luminaire 100 to 0.8°. The beam size iris 608 aperture may be controlled or otherwise adjusted by the control system 110. For example, the control system 110 may receive a command (e.g., via data link 107) that indicates a commanded aperture value for the beam size iris 608. In response to such a command, the control system 110 is configured to move the beam size iris 608 to achieve the commanded aperture value.

However, as beam size iris 608 is now blocking a large amount of energy in the light beam, it may be damaged (e.g., by heat generated by the absorbed optical energy) when closed to such a size. In some luminaires, the control system 110 may reduce the light output of the luminaire in order to prevent such damage to the iris. However, a dimmer beam is less useful for such long distance beams. Instead, the control system 110 moves the beam reducer 624 into the beam in addition to closing beam size iris 608. The beam reducer 624 reduces the light beam angle before the light enters beam size iris 608, and thus reduces the energy of the light beam entering the beam size iris 608. In some embodiments, the beam reducer 624 reduces the beam angle from a 3.5° light beam exiting the animation subsystem 604 to a 2° light beam entering the beam size iris 608.

In some embodiments, the beam reducer 624 may be automatically placed in the beam by the control system 110 when needed. For example, if the operator closes beam size iris 608 down to a small aperture, the control system 110 may recognize the configuration and automatically bring the beam reducer 624 into the beam to reduce or prevent damage to the beam size iris 608.

The beam reducer 624 is mounted in the gobo wheel 606 in some embodiments. For example, the beam reducer 624 may be a single hole gobo in the gobo wheel 606 that reduces the angle of the received light beam. In other embodiments, the beam reducer 624 may be mounted separately from the gobo wheel 606, such as on an arm that is actuated by an actuator (e.g., to move the beam reducer 624 into and out of the optical path of the light beam). In general, the beam reducer 624 is configured to move between a first position and a second position. The first position is any position in which the beam reducer 624 is outside an emitted light beam (e.g., from the light source 600). The second position is one in which the beam reducer 624 is in the optical path of the light beam. In the context of this disclosure, the beam reducer 624 being in the optical path of the light beam refers to a position in which the beam reducer 624 receives the emitted light beam and occludes an outer portion of the emitted light beam to emit a reduced light beam. The reduced light beam thus has a smaller beam angle than the emitted light beam. The beam reducer 624 may receive the emitted light beam directly from the light source 600, or from another component that is between the beam reducer 624 and the light source 600.

Thus, when the beam reducer 624 is in the second position, the beam reducer 624 absorbs optical energy of the outer portion of the emitted light beam. In accordance with various embodiments, the beam reducer 624 is designed such that the absorbed optical energy does not damage the beam reducer 624. For example, the beam reducer 624 may be manufactured from a metal having a sufficient thickness so as to not deform in response to a temperature generated by the absorbed optical energy. In another example, a fan provides cooling to the beam reducer 624 to avoid damage from the absorbed optical energy. In yet another example, the beam reducer 624 is coupled to a heat sink and/or a heat pipe to provide cooling to the beam reducer 624 to avoid damage from the absorbed optical energy.

Regardless of how the beam reducer 624 is moved between the first and second positions, the beam reducer 624 is upstream in the optical path from the beam size iris 608. Accordingly, the beam size iris 608 is configured to receive the emitted light beam when the beam reducer 624 is in the first position (i.e., when the beam reducer 624 is not in the optical path). Conversely, the beam size iris 608 is configured to receive the reduced light beam when the beam reducer 624 is in the second position. Thus, in the second position, the beam reducer 624 reduces the energy of the light beam impinging on the beam size iris 608, and thus reduces the likelihood of the beam size iris 608 being damaged by absorbing optical energy of the light beam from the light source 600.

In accordance with various embodiments, the position of the beam reducer 624 may be controlled by the control system 110. That is, the control system 110 is configured to generate signals that cause the beam reducer 624 to move between the first and second positions in response to various scenarios, in response to various conditions being satisfied, and/or in response to various commands being received (e.g., via data link 107).

For example, in an embodiment, the beam reducer 624 is configured to move to the second position in response to an aperture of the beam size iris 608 being smaller than a predetermined threshold value. In other words, the control system 110 is configured to cause the beam reducer 624 to move to the second position in response to a determination that the aperture of the beam size iris 608 is smaller than the predetermined threshold value. The threshold value may be set such that, above the threshold value, an area of the beam size iris 608 that is exposed to the light beam is small enough that the beam size iris 608 does not absorb enough optical energy to damage the beam size iris 608. However, as the beam size iris 608 aperture is further reduced in size, a greater area of the beam size iris 608 is exposed to the light beam, and thus the beam size iris 608 may absorb sufficient optical energy to damage the beam size iris 608 if the beam reducer 624 is not in the second position. Thus, the threshold value is set such that, when the beam size iris 608 aperture is smaller than the threshold value, the beam size iris 608 would likely be damaged if the beam reducer 624 is not in the second position.

In some embodiments, the beam reducer 624 is also configured to move to the first position in response to the beam size iris 608 aperture being larger than the predetermined threshold. In other words, the control system 110 is configured to cause the beam reducer 624 to move to the first position in response to a determination that the aperture of the beam size iris 608 is larger than the predetermined threshold value. In an example in which the beam reducer 624 is mounted in the gobo wheel 606, this may enable the gobo wheel 606 to be used to provide other effects when the beam size iris 608 aperture is sufficiently open so as to not be damaged by the optical energy of the light beam.

In certain embodiments, the beam reducer 624 is configured to move to the first and second positions in response to a direct command to do so. For example, the control system 110 is configured to cause the beam reducer 624 to move to the second position in response to receiving a command via the data link 107 to place the luminaire 100 in a beam reduction mode.

Regardless of whether the beam reducer 624 is caused to be in the second position based on the size of the beam size iris 608 aperture or a direct command, when the beam reducer 624 is in the second position, the control system 110 may be configured to ignore commands received via the data link 107 to move the beam reducer 624 to the first position.

For example, when the beam size iris 608 aperture is smaller than the predetermined threshold value, the control system 110 is configured to ignore a command to move the beam reducer 624 to the first position (or a command to adjust a position of the gobo wheel 606 when the beam reducer 624 is mounted thereto). In another example, when the luminaire 100 has been placed in the beam reduction mode, the control system 110 is configured to ignore a command to move the beam reducer 624 to the first position (or a command to adjust a position of the gobo wheel 606 when the beam reducer 624 is mounted thereto). Thus, the control system 110 is configured to act as a safeguard against erroneous user instructions that may cause damage to the beam size iris 608, such as by moving the beam reducer 624 to the first position while the beam size iris 608 aperture is sufficiently small that the beam size iris 608 would be damaged by the optical energy of the light beam impinging upon it.

Figure 8A:
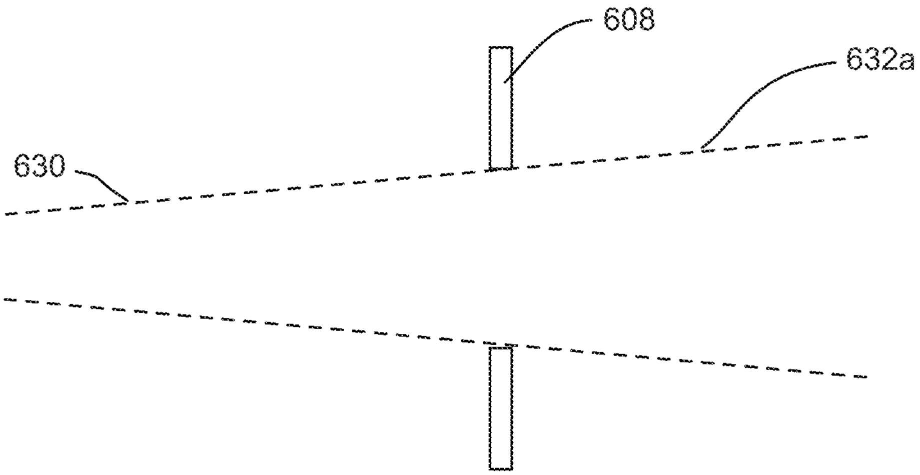
FIGS. 8A, 8B, and 8C present diagrammatic views of an iris protection system according to the disclosure.
Figure 8B:
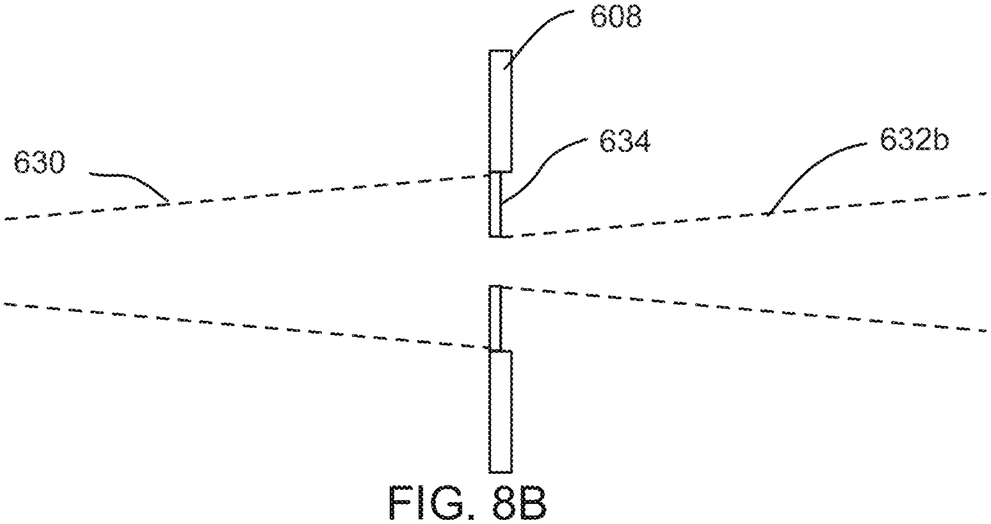
Figure 8C:
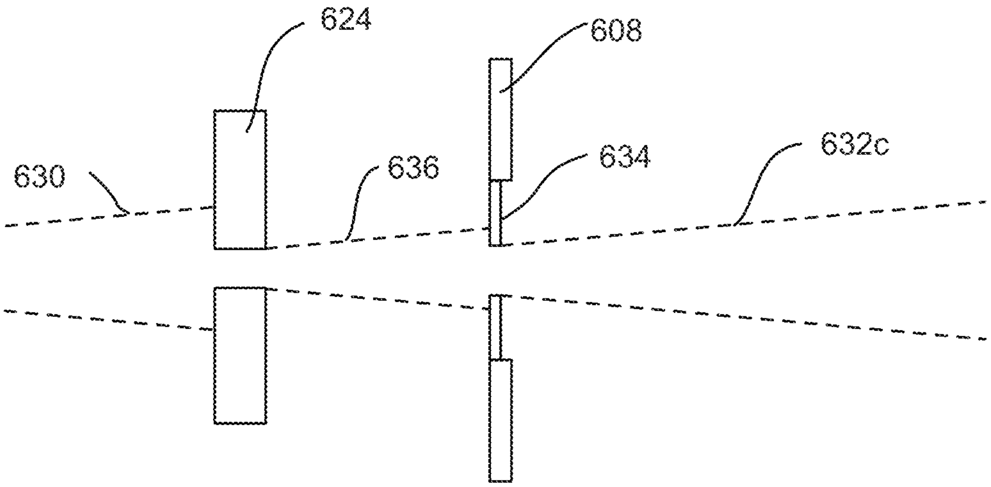

FIG. 8A, FIG. 8B, and FIG. 8C illustrate diagrammatically an iris protection system according to the disclosure. FIG. 8A shows a light beam 630 passing through the beam size iris 608 when beam size iris 608 is fully open, producing an exit light beam 632*a*.

FIG. 8B shows the beam size iris 608 in a configuration where iris leaves 634 of the beam size iris 608 reduce the aperture size. As may be seen, a large proportion of the light beam 630 is now being blocked by the iris leaves 634, resulting in an exit light beam 632*b*, which has a smaller beam angle than the exit light beam 632*a*. In this configuration, the iris leaves 634 and the beam size iris 608 may be damaged by absorbing the blocked energy of the light beam 630.

FIG. 8C shows a configuration with beam reducer 624 introduced into the light beam 630. The beam reducer 624 reduces the light beam 630 to produce a reduced light beam 636, which has a narrower beam angle than the light beam 630. As such, the beam reducer 624 blocks much of the light energy from light beam 630 that would otherwise impinge on the iris leaves 634. The reduced light beam 636 passes through the beam size iris 608 in the reduced aperture size configuration (e.g., below the above-described predetermined threshold value), resulting in an exit beam 632*c*. However, by the action of the beam reducer 624 producing the reduced light beam 636, a smaller portion of the beam energy of the light beam 630 impinges on the iris leaves 634. While the exit beam 632*c* is of the same beam angle as the exit beam 632*b*, less or no damage is done to the iris leaves 634 and the beam size iris 608.

Figure 9:
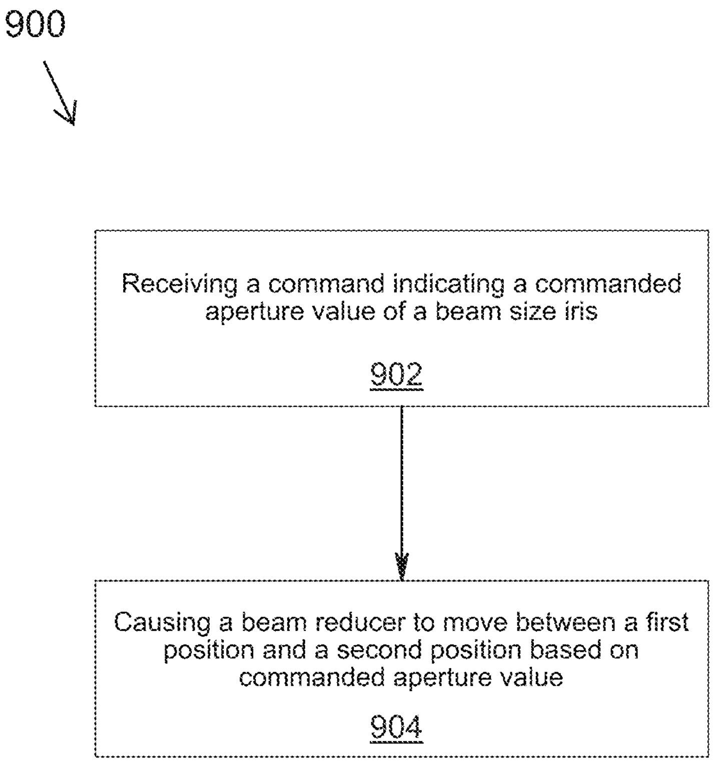
FIG. 9 presents a flow chart of a method of controlling a luminaire according to the disclosure.

FIG. 9 shows a flow chart of a method 900 of controlling a luminaire 100 according to the disclosure. The method 900 begins in block 902 with receiving a command indicating a commanded aperture value of a beam size iris. For example, the control system 110 may receive a command (e.g., via data link 107) that indicates a commanded aperture value for the beam size iris 608. In response to such a command, the control system 110 is configured to move the beam size iris 608 to achieve the commanded aperture value.

The method 900 continues in block 904 with causing a beam reducer of the luminaire 100 to move between a first position and a second position based on the commanded aperture value. As described above, in the first position, the beam reducer 624 is outside the light beam emitted from the light source 600. In the second position, the beam reducer 624 receives the light beam from the light source 600 and occludes an outer portion of the emitted light beam to emit a reduced light beam, where the reduced light beam has a smaller beam angle than the emitted light beam.

For example, the control system 110 is configured to cause the beam reducer 624 to move to the second position in response to a determination that the aperture of the beam size iris 608 is smaller than the predetermined threshold value explained above. In addition, or in another example, the control system 110 is configured to cause the beam reducer 624 to move to the first position in response to a determination that the aperture of the beam size iris 608 is larger than the predetermined threshold value. In another example, the control system 110 is additionally configured to cause the beam reducer 624 to move to the second position in response to receiving a command to place the luminaire 100 in a beam reduction mode.

Thus, the method 900 avoids damage to the beam size iris 608 by bringing the beam reducer 624 into the light beam in response to certain scenarios in which the beam size iris 608 might otherwise be damaged if exposed to the unreduced light beam (thus absorbing the optical energy thereof).

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A luminaire, comprising:
a light source configured to generate an emitted light beam;
a beam reducer configured to move between a first position and a second position, wherein:
in the first position, the beam reducer is outside the emitted light beam, and
in the second position, the beam reducer receives the emitted light beam and occludes an outer portion of the emitted light beam to emit a reduced light beam having a smaller beam angle than the emitted light beam, wherein in the second position the beam reducer is configured to absorb optical energy of the outer portion of the emitted light beam without damage to the beam reducer; and
a beam size iris configured to receive (i) the emitted light beam when the beam reducer is in the first position and (ii) the reduced light beam when the beam reducer is in the second position,
wherein the beam reducer is configured to move to the second position in response to an aperture of the beam size iris being smaller than a predetermined threshold value.

2. The luminaire of claim 1, further comprising a gobo wheel, wherein the beam reducer is mounted in the gobo wheel, and wherein the gobo wheel is configured to move the beam reducer between the first and second positions.

3. The luminaire of claim 1, further comprising a control system configured to:
receive, via a data link, a command indicating a commanded aperture value of the beam size iris; and
control a position of the beam reducer between the first position and the second position based on the commanded aperture value.

4. The luminaire of claim 3, wherein the control system is further configured to ignore a command to move the beam reducer to the first position when the aperture is smaller than the predetermined threshold value.

5. The luminaire of claim 1, wherein the beam reducer is configured to move to the first position in response to an aperture of the beam size iris being larger than a predetermined threshold value.

6. The luminaire of claim 1, further comprising a control system configured to move the beam reducer to the second position in response to receiving a command via a data link to place the luminaire in a beam reduction mode.

7. The luminaire of claim 6, wherein the control system is further configured to ignore a command to move the beam reducer to the first position while the luminaire is in the beam reduction mode.

8. The luminaire of claim 6, further comprising a gobo wheel, wherein the beam reducer is mounted in the gobo wheel, and wherein the control system is further configured to ignore a command to adjust a position of the gobo wheel when the luminaire is in the beam reduction mode and after the beam reducer moves to the second position.

9. A luminaire control system, comprising:
an actuator configured to move a beam reducer between a first position and a second position, wherein:
in the first position, the beam reducer is outside an emitted light beam, and
in the second position, the beam reducer receives the emitted light beam and occludes an outer portion of the emitted light beam to emit a reduced light beam having a smaller beam angle than the emitted light beam;
a beam size iris configured to receive (i) the emitted light beam when the beam reducer is in the first position and (ii) the reduced light beam when the beam reducer is in the second position; and
a control system electrically coupled to the actuator and the beam size iris and configured to:
adjust an aperture of the beam size iris; and
cause the actuator to move the beam reducer between the first position and the second position.

10. The luminaire control system of claim 9, wherein the control system is configured to:
receive, via a data link, a command indicating a commanded aperture value of the beam size iris; and
control a position of the beam reducer between the first position and the second position based on the commanded aperture value.

11. The luminaire control system of claim 10, wherein the control system is configured to move the beam reducer to the second position in response to determining that the commanded aperture value is smaller than a predetermined threshold value.

12. The luminaire control system of claim 10, wherein the control system is configured to move the beam reducer to the first position in response to determining that the commanded aperture value is larger than a predetermined threshold value.

13. The luminaire control system of claim 9, wherein the control system is configured to:
receive, via a data link, a second command to place a luminaire in a beam reduction mode; and
control the beam reducer to move to the second position in response to the second command.

14. The luminaire control system of claim 13, wherein the control system is configured to:
receive, via the data link, a third command to move the beam reducer to the first position while the luminaire is in the beam reduction mode; and
ignore the third command while the luminaire is in the beam reduction mode.

15. The luminaire control system of claim 13, wherein the actuator is a gobo wheel, and wherein the control system is configured to:
receive, via the data link, a fourth command to adjust a position of the gobo wheel while the luminaire is in the beam reduction mode; and
ignore the fourth command while the luminaire is in the beam reduction mode.

16. A method of controlling a luminaire, comprising:
receiving, by a control system of the luminaire via a data link, a command indicating a commanded aperture value of a beam size iris; and
causing, by the control system, a beam reducer of the luminaire to move between a first position and a second position based on the commanded aperture value,
wherein in the first position, the beam reducer is outside a light beam emitted from a light source of the luminaire, and wherein in the second position, the beam reducer receives the emitted light beam and occludes an outer portion of the emitted light beam to emit a reduced light beam having a smaller beam angle than the emitted light beam.

17. The method of claim 16, further comprising moving, by the control system, the beam reducer to the second position in response to determining that the commanded aperture value is smaller than a predetermined threshold value.

18. The method of claim 16, further comprising moving, by the control system, the beam reducer to the first position in response to determining that the commanded aperture value is larger than a predetermined threshold value.

19. The method of claim 16, further comprising:

receiving, by the control system via the data link, a second command to place the luminaire in a beam reduction mode; and causing, by the control system, the beam reducer to move to the second position in response to the second command.

20. The method of claim 19, further comprising:

receiving, by the control system via the data link, a third command to move the beam reducer to the first position while the luminaire is in the beam reduction mode; and ignoring, by the control system, the third command while the luminaire is in the beam reduction mode.

21. The method of claim 19, wherein the beam reducer is mounted in a gobo wheel, and the method further comprises:

receiving, by the control system via the data link, a fourth command to adjust a position of the gobo wheel while the luminaire is in the beam reduction mode; and ignoring, by the control system, the fourth command while the luminaire is in the beam reduction mode.

* * * * *